United States Patent
Matsumura et al.

(10) Patent No.: US 9,698,583 B1
(45) Date of Patent: Jul. 4, 2017

(54) JUNCTION BOX ASSEMBLIES WITH SPACED APART WALLS TO HOLD A CORRUGATED TUBE

(71) Applicant: Sumitomo Wiring Systems, Ltd., Yokkaichi, Mie (JP)

(72) Inventors: Akihiro Maximilian Matsumura, Farmington Hills, MI (US); Charles Paul Depp, Ann Arbor, MI (US); Thomas John Meyers, Temperance, MI (US); Aaron Mark Steffka, Livonia, MI (US)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/184,115

(22) Filed: Jun. 16, 2016

(51) Int. Cl.
*H02G 3/08* (2006.01)

(52) U.S. Cl.
CPC .................. *H02G 3/088* (2013.01)

(58) Field of Classification Search
CPC ...................................... H02G 3/088
USPC ....................................... 174/520
See application file for complete search history.

(56) References Cited

U.S. PATENT DOCUMENTS

| | | | | |
|---|---|---|---|---|
| 5,703,325 A * | 12/1997 | Yamaguchi | ............ | H02G 3/088 174/50 |
| 6,570,088 B1 * | 5/2003 | Depp | .................. | B60R 16/0238 174/50 |
| 6,743,981 B2 * | 6/2004 | Miyakoshi | ............. | H02G 3/081 16/2.1 |
| 6,768,054 B2 * | 7/2004 | Sato | ........................ | H02G 3/088 174/50 |
| 7,077,281 B2 * | 7/2006 | Sato | .......................... | H02G 3/10 220/3.8 |
| 8,907,215 B2 * | 12/2014 | Sakai | .................... | H02G 3/0691 174/489 |
| 9,331,462 B2 * | 5/2016 | Kaneko | ............... | B60R 16/0238 |
| 2002/0102871 A1 * | 8/2002 | Depp | ...................... | H05K 7/026 439/76.2 |
| 2008/0149385 A1 * | 6/2008 | Kanamaru | ............. | H02G 3/083 174/520 |
| 2012/0285728 A1 * | 11/2012 | Sakai | .................... | H02G 3/0691 174/152 G |

(Continued)

FOREIGN PATENT DOCUMENTS

JP 2000299909 A 10/2000
JP 2016019406 A 2/2016

*Primary Examiner* — Timothy Thompson
*Assistant Examiner* — Michael F McAllister
(74) *Attorney, Agent, or Firm* — Dinsmore & Shohl LLP

(57) ABSTRACT

An electric junction box assembly configured to store an electric component is provided. The electric junction box assembly includes a corrugated tube configured to hold a wire for supply power. The electric junction box assembly includes a junction box having an outer wall and a bottom wall. The outer wall includes an outer opening for receiving the corrugated tube. The junction box includes a plurality of inner walls. Each of the inner walls is spaced apart from each other so as to form an inner chamber and each inner wall further including an inner opening configured to receive the corrugated tube. Each inner chamber includes a drain hole so as to allow fluids to escape and prevent the electric components from being damaged by water or humidity.

16 Claims, 6 Drawing Sheets

(56) References Cited

U.S. PATENT DOCUMENTS

2014/0311793 A1* 10/2014 Kaneko ............... B60R 16/0238
174/560
2014/0312031 A1* 10/2014 Kaneko ................. H02G 3/081
220/3.8

* cited by examiner

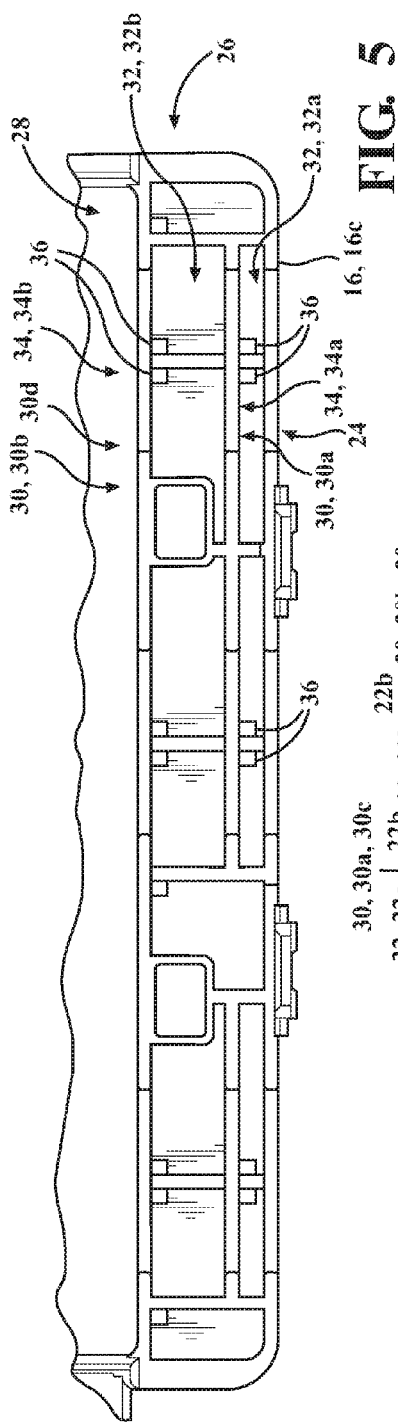
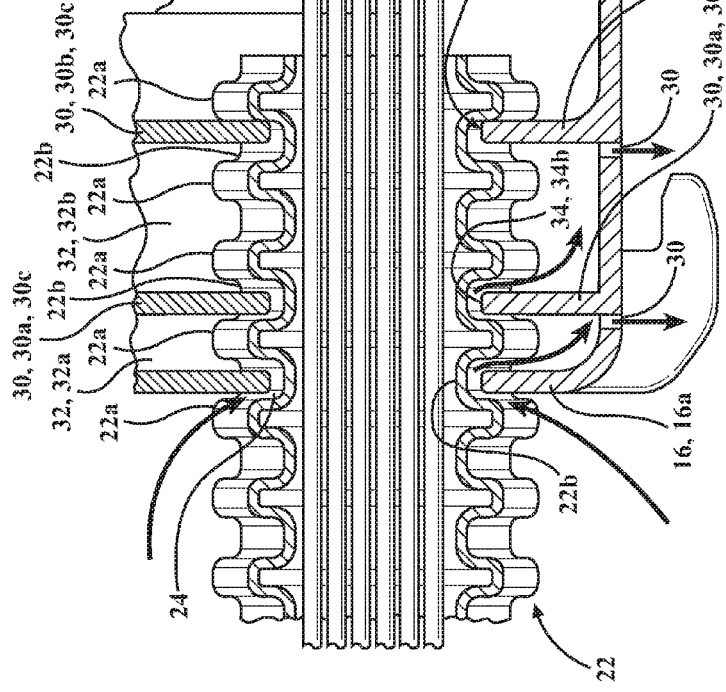

JUNCTION BOX ASSEMBLIES WITH SPACED APART WALLS TO HOLD A CORRUGATED TUBE

TECHNICAL FIELD

The present specification generally electric junction box assemblies and, more particularly electric junction box assemblies configured to prevent fluids from contacting electric components.

BACKGROUND

In general, electric junction box assemblies include a junction box for storing electric components. The electric components are configured to power and control electronic devices. The electric components illustratively include a bus bar, relays, switches and a controller for controlling electric devices. For instance, the electric junction box assemblies may be used in an automotive vehicle to control the actuation of windshield wipers, fans for the HVAC system, mirrors or the like.

The electric junction box may be housed under the hood of the automotive vehicle, and though partially shielded from the environment is still exposed to water, moisture and the like. Thus, it should be appreciated that it is desirable to keep the electric components dry as water may result in damage.

Water may enter the junction box through a wire which powers the electric components. In some instances, the wire is housed in a corrugated tube to help prevent water from entering the junction box. However, water may still enter as a result of the capillary nature of water. Accordingly, it remains desirable to have an electronic junction box assembly having an outlet for the water to drain so as to keep the electronic components dry.

SUMMARY

In one embodiment, an electric junction box assembly configured to store and keep electric components dry. The electric junction box assembly includes a junction box. The junction box includes an outer wall and a bottom wall. The outer wall is a continuous surface on the sides and back end and extends upwardly from the peripheral edge of the bottom wall so as to form a storage area. The front end of the outer wall includes at least one outer opening for receiving a corrugated tube.

The storage area includes a drain chamber and a main chamber. The electric components are stored within the main chamber. The electric components are power by a wire. A portion of the wire is housed within a corrugated tube. A distal end portion of the corrugated tube is disposed within the drain chamber.

The drain chamber includes a plurality of inner walls. Each of the plurality of inner walls is spaced apart from each other so as to form an inner chamber between each of the plurality of walls. Each of the plurality of inner walls further includes an inner opening. A drain hole is disposed in each of the inner chambers. The drain hole is disposed on the bottom wall of a respective inner chamber so as to allow fluids to escape before reaching the main chamber.

In another embodiment, the electric junction box assemblies include a top housing, a bottom housing and a top cover. A top half of each of the plurality of inner walls are disposed on the top housing and a bottom half of each of the plurality of inner walls are disposed on the bottom housing.

The electric junction box assembly includes a coupling member configured to couple the bottom housing to the top housing. The bottom housing and the top housing are dimensioned in such a manner that the top half of each of the plurality of inner walls is registered to a respective bottom half of the plurality of inner walls so as to form a bottom half and top half of a respective inner opening. In such an embodiment, installing the corrugated tube to the electric junction box is made simple by placing the corrugated tube in either the bottom half or the top half of the inner opening and mounting the bottom housing to the top housing so as to enclose the corrugated tube within the outer opening and inner openings.

Accordingly, water entering into the junction box drips onto the bottom wall and is allowed to drain out the drain hole before reaching the electric components so as to keep the electric components dry.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5 is a top down view showing the inner chambers of the bottom housing and the drain holes;

FIG. 7 schematically depicts the flow of water with respect to the electric junction box assembly according to one or more embodiments shown and described herein.

DETAILED DESCRIPTION

Reference will now be made in detail to embodiments of electric junction box assemblies having an electric junction box assembly configured to keep electric components stored therein dry. The junction box includes an outer wall and a bottom wall. The outer wall is a continuous surface on the sides and back end and extends upwardly from the peripheral edge of the bottom wall so as to form a storage area for housing the electric components.

The storage area includes a main chamber and a drain chamber. The electric components are stored within the main chamber. The drain chamber is disposed between the outer wall and the main chamber. The drain chamber includes a drain hole so as to allow fluids to drain before reaching the main chamber.

The front end of the outer wall includes at least one outer opening in communication with the drain chamber. The outer opening is configured to receive the corrugated tube. The drain chamber includes a plurality of inner walls. Each of the plurality of inner walls is spaced apart from each other so as to form an inner chamber between each of the plurality of walls. Each of the plurality of inner walls further including an inner opening. The drain holes are disposed in each of the inner chambers. The drain hole is disposed on the bottom wall of a respective inner chamber so as to allow fluids to escape before reaching the electric components. It should be appreciated that water may be formed within the drain chamber as a result of condensation as well as the capillary action of water. In either event, water or humidity may escape through the drain holes so as to prevent water and/or moisture from reaching the electric components in the main chamber.

Figure 1:
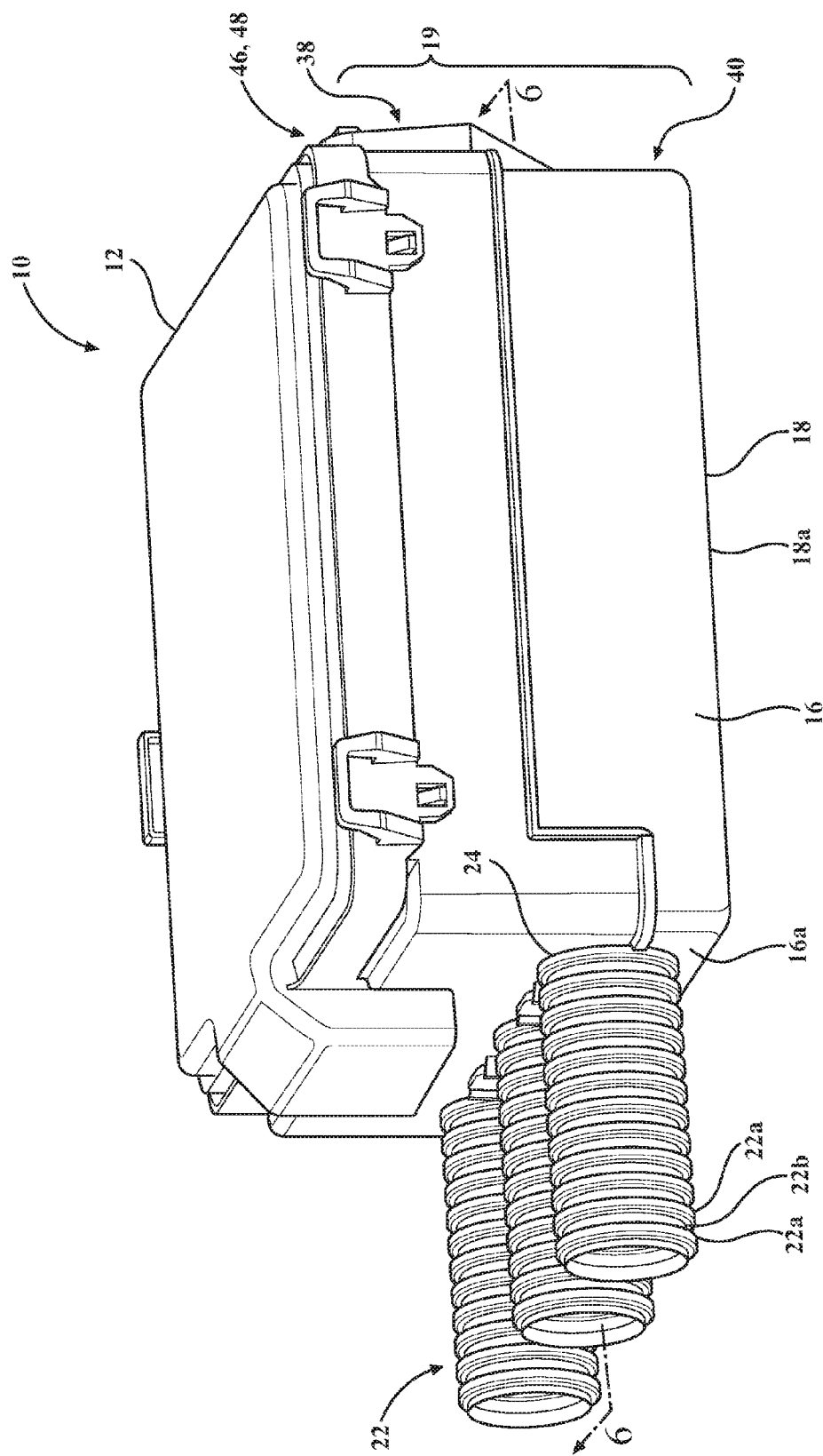
FIG. 1. is a perspective view of an electric junction box assembly according to one or more embodiments shown and described herein.

With reference now to FIG. 1 an electric junction box assembly 10 in accordance to one or more embodiments described herein is provided. The electric junction box assembly 10 includes a top cover 12 and a junction box 14. The junction box 14 is configured to store electric components (not shown).

The junction box 14 includes an outer wall 16 and a bottom wall 18. The outer wall 16 bounds a peripheral edge 18a of the bottom wall 18 and extends upwardly from the peripheral edge of the bottom wall 18 so as to define a storage area 20. The junction box 14 assembly further includes a corrugated tube 22 coupled to a front end 16a of the outer wall 16 of the junction box 14. In particular, the corrugated tube 22 is mounted to an outer opening 24 disposed on the front end 16a of the outer wall 16 of the junction box 14. For illustrative purposes, the junction box assembly 10 is shown having three (3) corrugated tubes 22 each inserted into a respective outer opening 24. However, it should be appreciated that the number of corrugated tubes 22 shown is for illustrative purposes and is not limiting to the scope of the appended claims.

Figure 6:
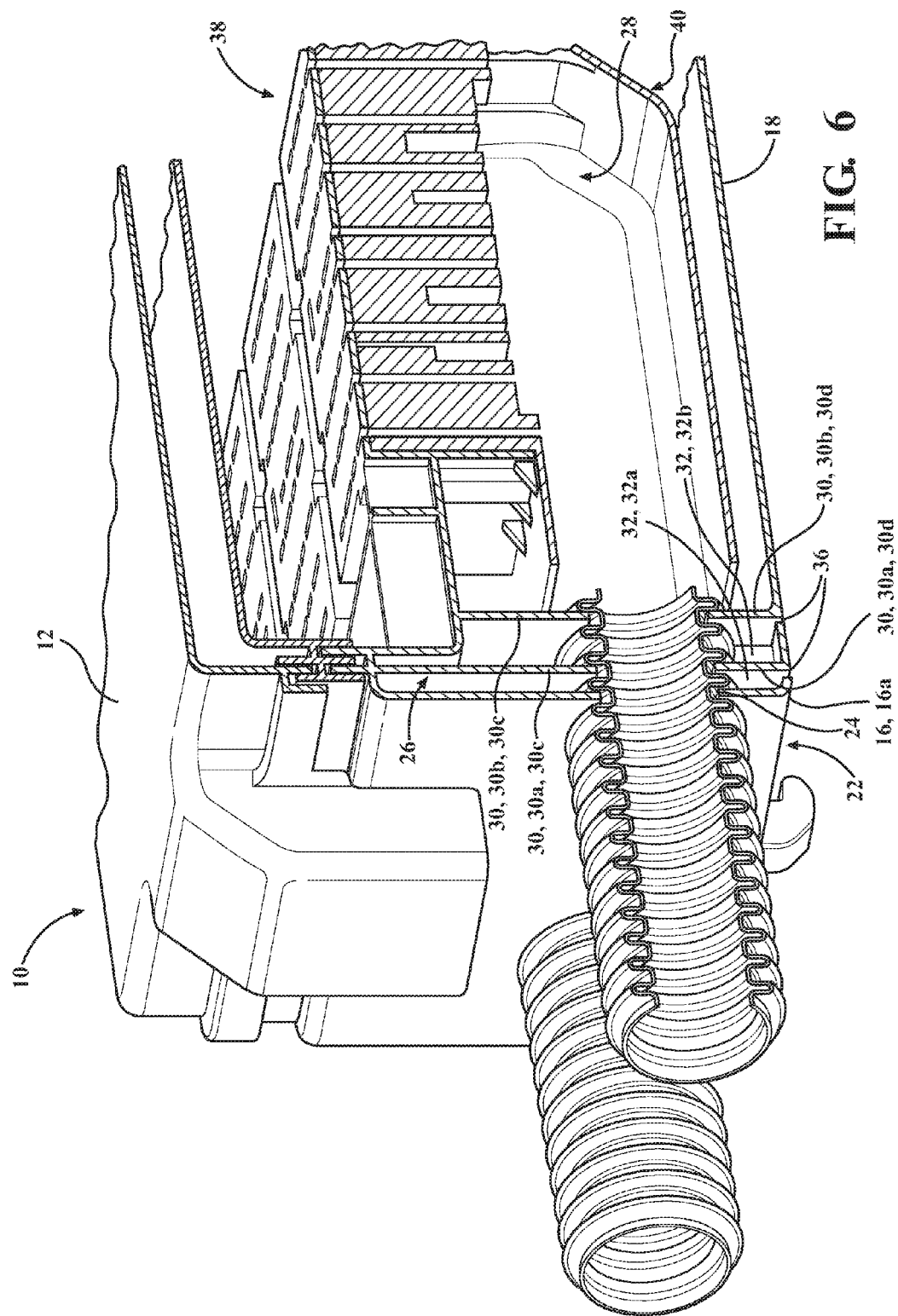
FIG. 6 is a cross-sectional view of the electric junction box assembly shown in FIG. 1 taken along lines 6-6.

With reference now to FIG. 6, a cross-sectional view of the junction box 14 assembly shown in FIG. 1 taken along lines 6-6 is provided. The junction box 14 further includes a drain chamber 26 and a main chamber 28. The drain chamber 26 includes a plurality of inner walls 30. Each inner wall 30 is spaced apart from the other so as to form an inner chamber 32 between each of the plurality of inner walls 30. For illustrative purposes, the drain chamber 26 is shown as having two inner walls 30 forming two inner chambers 32. The outermost inner wall 30a is directly spaced apart from the outer wall 16 and the innermost inner wall 30b separates the drain chamber 26 from the main chamber 28. Each of the inner walls 30 include an inner opening 34. The inner openings 34 may be the same in dimension as the outer opening 24. Each of the inner chambers 32 includes a drain hole 36. The drain hole 36 is disposed on the bottom wall 18 of a respective inner chamber 32 so as to allow fluids to escape.

Figure 2:
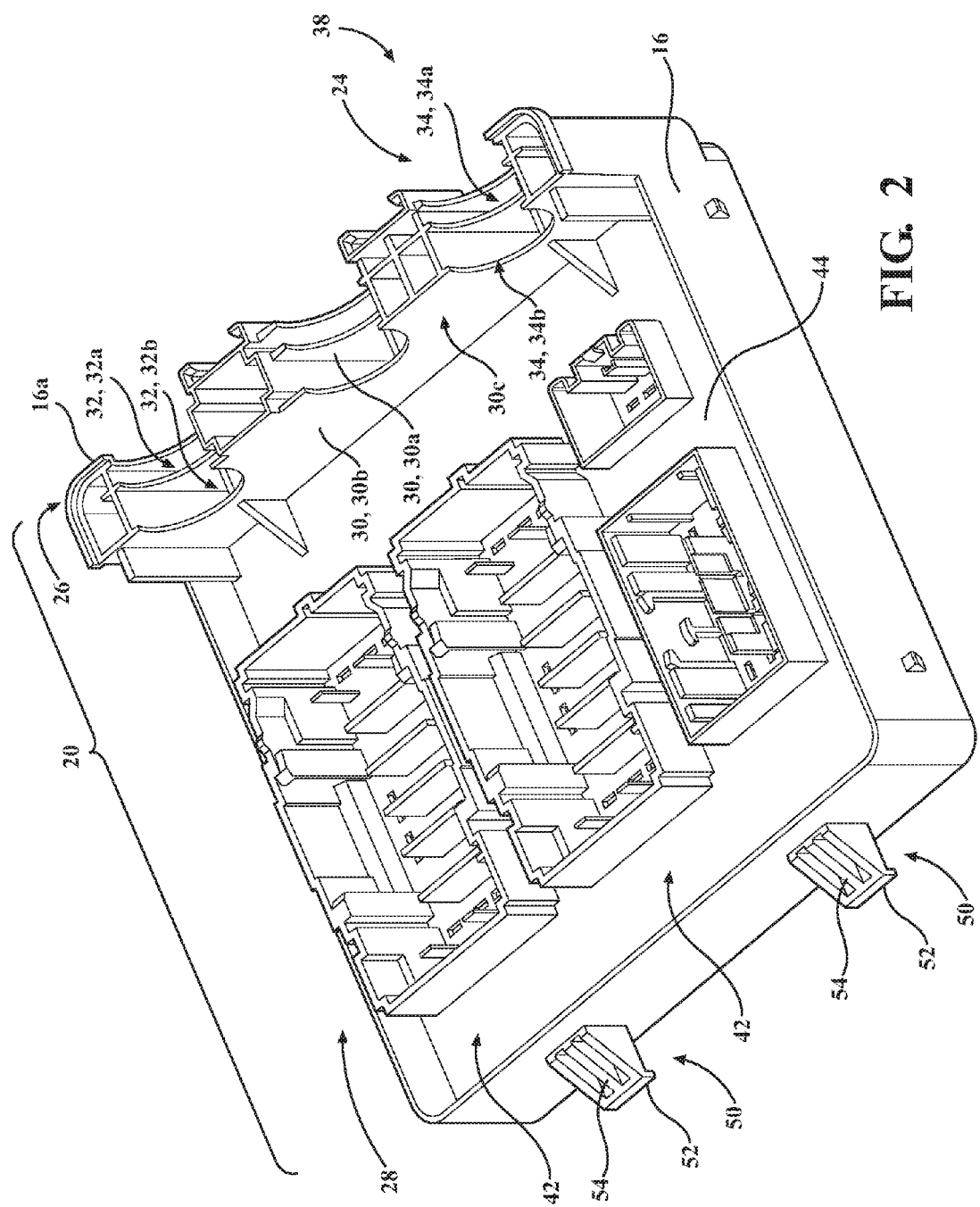
FIG. 2 is a perspective view of a top housing of the electric junction box assembly shown in FIG. 1.

With reference again to FIGS. 1 and 6, the junction box 14 may be formed by a top housing 38 and a bottom housing 40. FIG. 2 is a perspective view taken from the underside of the top housing 38. As used herein, the term underside describes the surface of the top housing 38 with respect to the orientation of the junction box 14 assembly shown in FIG. 6, wherein the underside of the top housing 38 is the surface directly opposite the bottom wall 18 of the junction box 14. The top housing 38 includes a plurality of connector housings 42 for receiving terminal connectors (not shown). The connector housings 42 are generally centered on a top housing substrate 44.

Figure 3:
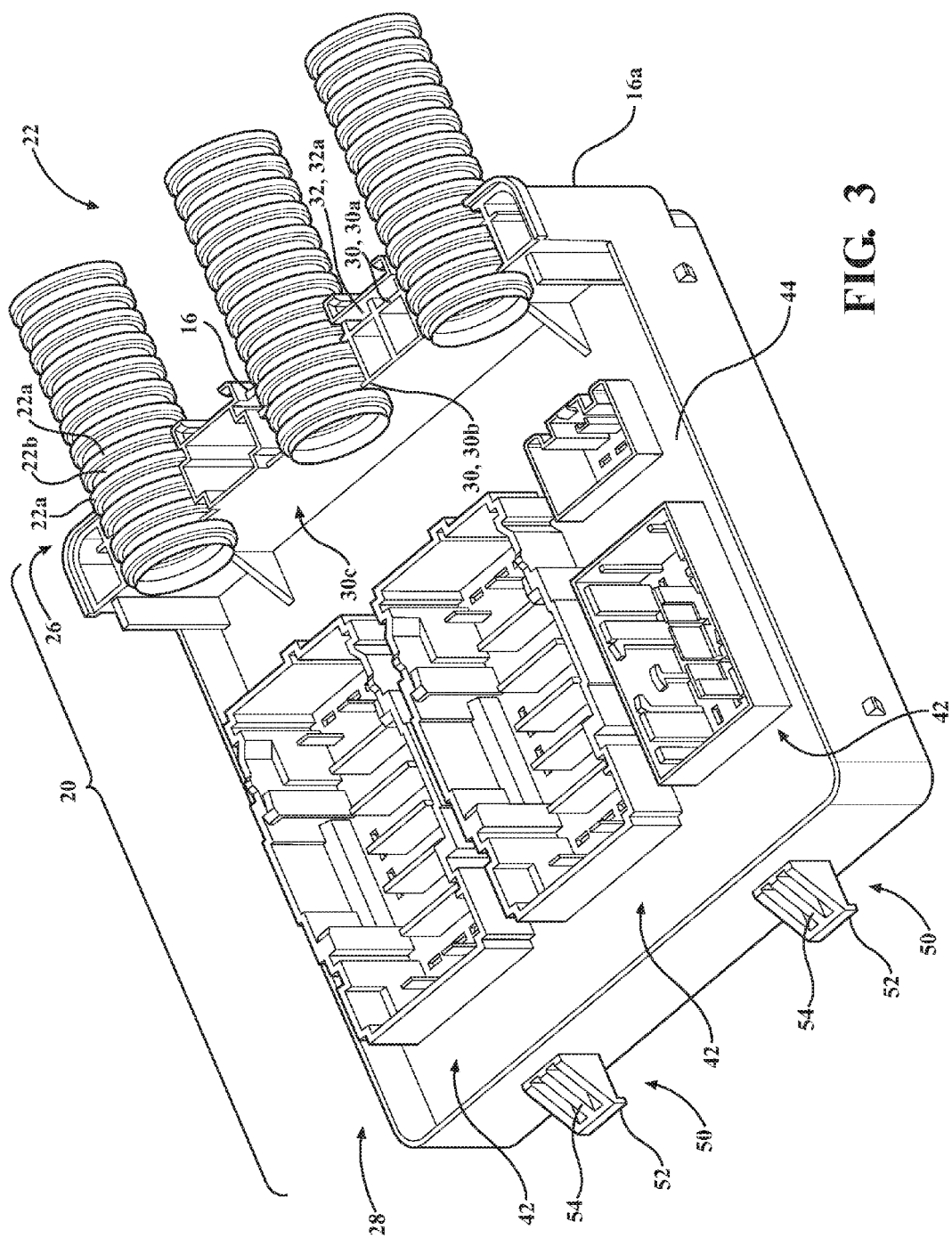
FIG. 3 is a perspective view of a top housing in FIG. 2 with the corrugated tube fitted onto a top half of an inner opening and outer opening.
Figure 4:
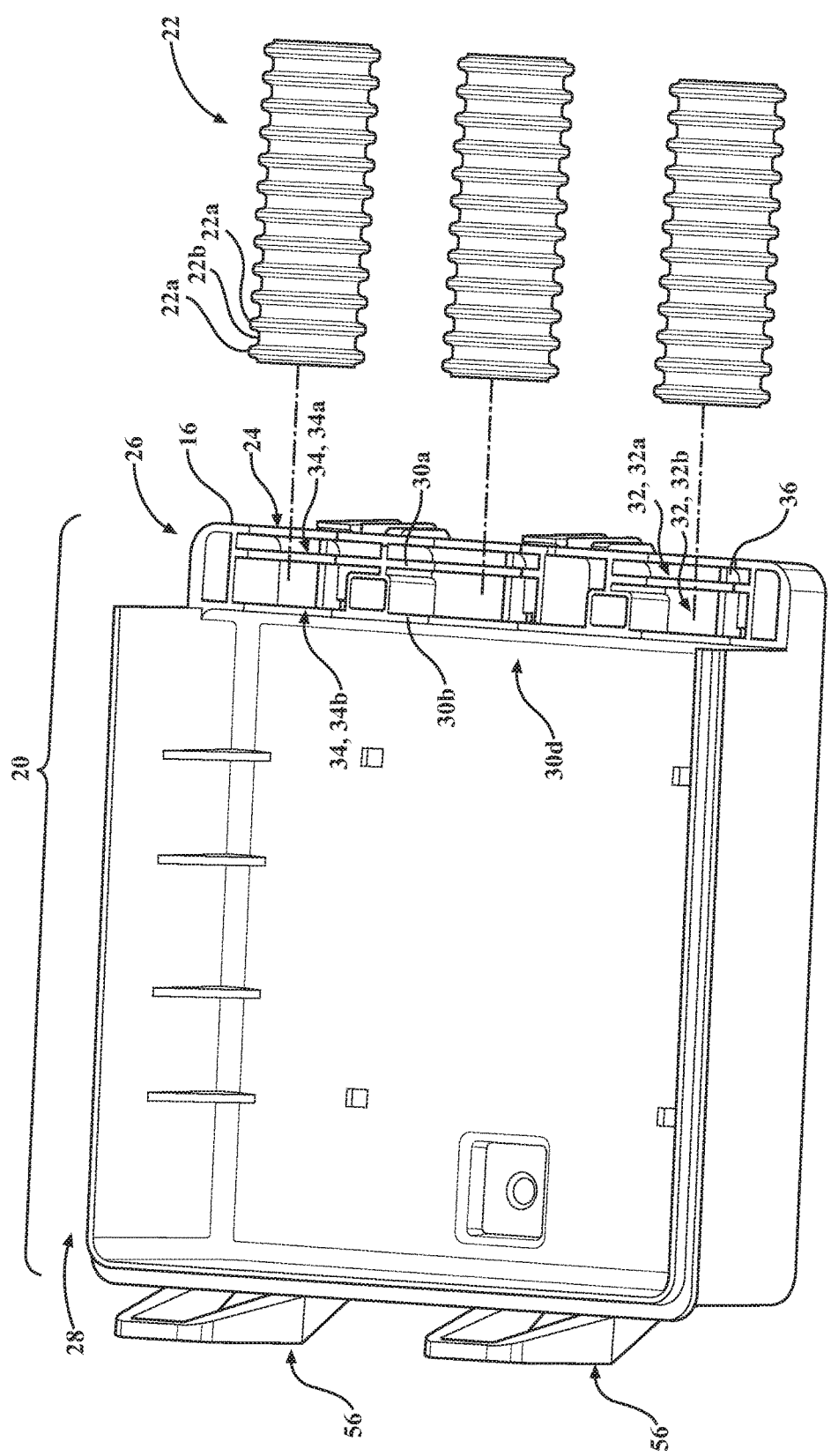
FIG. 4 is a perspective view of a bottom housing of the electric junction box assembly shown in FIG. 1.

In one embodiment, the inner walls 30 are formed in from a top half 30c (shown in FIGS. 2, 3 and 6) and a bottom half 30d (shown in FIGS. 4, 5 and 6). FIG. 2 shown the top half 30c of the inner walls 30 fixedly mounted to the top housing substrate 44. The top half 30c of the inner walls 30 include a top half 34a of the inner openings 34. FIG. 3 illustrates how the corrugated tube 22 is fitted onto the top half 30c of the inner walls 30.

FIGS. 4 and 5 are top down views of the bottom housing 40. FIG. 4 shows the delineation between the drain chamber 26 and the main chamber 28. The bottom housing 40 includes a bottom half 30d of the inner walls 30. The bottom half 30d of the inner walls 30 include a bottom half 34b of the inner openings 34. FIG. 4 illustrates how the corrugated tube 22 is fitted onto the bottom half 30d of the inner walls 30. FIG. 6 shows how the bottom housing 40 and the top housing 38 are coupled together so as to register the bottom half 30d of the inner walls 30 with a respective top half 30c of the inner walls 30 so as to form respective inner openings 34 and the outer opening 24.

The electric junction box assembly 10 may further including a coupling member 46. FIG. 1 provides an illustrative embodiment of the coupling member 46. The coupling member 46 is configured to couple the bottom housing 40 to the top housing 38. The coupling member 46 may be formed with a keyed feature so as to ensure that the bottom housing 40 may only be coupled to the top housing 38 in a prescribed manner so as to ensure that the top half of each of the plurality of inner walls 30 are registered to a respective bottom half of the plurality of inner walls 30 so as to form a respective inner opening 34. For illustrative purposes, the coupling member 46 is shown as a snap-fit engagement 48. The top housing 38 includes at least one prong 50 (shown in FIG. 2). Each prong 50 includes a lip 52. The lip 52 is formed on a distal end of the prong 50. The prong 50 is illustratively shown having a ramp shaped body with a rib 54 generally centered on a backside of the ramp shaped body. The bottom housing 40 includes a bracket 56. The bracket 56 is a generally ramp shaped member having a slit configured to receive the lip 52 so as to secure the bottom housing 40 to the top housing 38 (see in FIG. 1). The prong 50 and the bracket 56 form the snap-fit engagement 48.

FIG. 6 shows an embodiment of the electric junction box assembly 10 wherein the drain chamber 26 is defined by a first inner wall 30a and a second inner wall 30b. The first and second inner walls 30a, 30b are formed by the top half 30c of the inner walls 30 of the top housing 38 and the bottom half 30d of the inner walls 30 of the bottom housing 40. The first inner wall 30 includes a first inner opening 34a. The second inner wall 30 includes a second opening 34b. The first inner wall 30 is disposed between the outer wall 16 and the second inner wall 30. The first inner wall 30 and the outer wall 16 define a first inner chamber 32a. The second inner wall 30 separates the drain chamber 26 from the main chamber 28. The second inner wall 30 and the first inner wall 30 define a second inner chamber 32b wherein the second inner chamber 32b is larger than the first inner chamber 32a.

FIG. 6 illustrates how the inner openings 34 are coaxial to the outer opening 24 so as to hold the corrugated tube 22 along a general axis parallel to the bottom wall 18. In particular, the first inner opening 34, the second inner opening 34 and the outer opening 24 are all aligned with each other.

The corrugated tube 22 includes a plurality of ridges 22a disposed on an outer surface of the corrugated tube 22. Each of the plurality of ridges 22a is generally equally spaced apart from each other so as to form a plurality of grooves 22b. The grooves 22b are disposed within the outer opening 24 and the inner openings 34, wherein the ridges 22a prevent the corrugated tube 22 from slipping out of the drain chamber 26. FIG. 6 shows one of the grooves 22b seated within the outer opening 24, and the pair of ridges 22a defining the groove 22b having a radius larger than the outer opening 24 so as to retain the corrugated tube 22 to the outer opening 24. Likewise, the grooves 22b disposed within respective inner openings 34 have a pair of ridges 22a having a radius larger than the respective inner openings 34 so as to retain the groove 22b within a respective inner opening 34.

FIG. 6 also shows an embodiment wherein the first inner wall 30 is spaced apart from the outer wall 16 such a distance so as to only accommodate one ridge 22a of the corrugated tube 22. However, the first wall is spaced apart the second wall such a distance so as to accommodate two ridges 22a. It should be appreciated that the dimensions provided herein are for illustrative purposes and not limiting to the scope of the appended claims.

FIG. 5 is a top down view showing the drain chamber 26. As described above, the drain chamber 26 includes a plurality of inner chambers 32. Each inner chamber 32 includes a drain hole 36. The drain hole 36 is disposed on the bottom wall 18 of a respective inner chamber 32 so as to allow fluids to escape. The drain hole 36 is illustratively shown as being generally rectangular. However, it should be appreciated that the drain hole 36 may be dimensioned otherwise. For instance, the drain hole 36 may be circular, triangular or the like. The bottom wall 18 of the drain chamber 26 may be angled so as to promote the flow of water, or fluids into respective drain holes 36.

With reference now to FIG. 7 an operation of the junction box assembly 10 is illustrated. The corrugated tube 22 is secured within the outer opening 24 and the inner openings 34, wherein the grooves 22a are mounted to outer opening 24 and inner openings 34 and the corrugated tube 22 is held therein by the ridges 22a engaging the outer opening 24 and the inner openings 34. The arrows show water/fluid entering the drain chamber 26 vis-à-vis a capillary action. Wherein water enters into the first inner chamber 32a and exists the inner chamber 32 through the drain hole 36a. It should be appreciated that should water would drain through drain hole 36b should water find its way into other inner chamber 32b through the first inner opening 34a. Accordingly, the junction box assembly 10 helps keep electrical components stored in the main chamber 28 dry.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. An electric junction box assembly configured to store an electric component, the electric junction box assembly having a corrugated tube configured to hold a wire for supply power, the electric junction box assembly comprising:
    a junction box configured to store the electric component, the junction box having an outer wall and a bottom wall, the outer wall including an outer opening for receiving the corrugated tube;
    a plurality of inner walls, each of the plurality of inner walls spaced apart from each other so as to form an inner chamber between each of the plurality of walls and a respective one of the plurality of walls and the outer wall, each of the plurality of inner walls further including an inner opening; and
    a drain hole in each of the inner chamber, the drain hole disposed on the bottom wall of a respective inner chamber so as to allow fluids to escape.

2. The electric junction box assembly as set forth in claim 1, wherein the junction box includes a top housing, a bottom housing and a top cover.

3. The electric junction box assembly as set forth in claim 2, wherein a top half of each of the plurality of inner walls are disposed on the top housing and a bottom half of each of the plurality of inner walls are disposed on the bottom housing.

4. The electric junction box assembly as set forth in claim 3, further including a coupling member configured to couple the bottom housing to the top housing wherein the top half of each of the plurality of inner walls are registered to a respective bottom half of the plurality of inner walls so as to form a respective inner opening.

5. The electric junction box assembly as set forth in claim 1, the plurality of inner walls is a first inner wall and a second inner wall, wherein the first inner wall is disposed between the outer wall and the second inner wall, the first inner wall and the outer wall defining a first inner chamber, and the second inner wall and the first inner wall defining a second inner chamber wherein the second inner chamber is larger than the first inner chamber.

6. The electric junction box assembly as set forth in claim 1, wherein each of the inner opening is coaxial to the outer opening.

7. An electric junction box assembly for storing an electric component, the electric junction box assembly comprising:
    a junction box configured to store the electric component, the junction box having an outer wall and a bottom wall, the outer wall including an outer opening;
    a corrugated tube, a portion of the corrugated tube mounted in the outer opening;
    a wire for supply power to the electric component, the wire disposed within the corrugated tube;
    a plurality of inner walls, each of the plurality of inner walls spaced apart from each other so as to form an inner chamber between each of the plurality of walls and a respective one of the plurality of walls and the outer wall, each of the plurality of inner walls further including an inner opening; and
    a drain hole in each of the inner chamber, the drain hole disposed on the bottom wall of a respective inner chamber so as to allow fluids to escape.

8. The electric junction box assembly as set forth in claim 7, wherein the junction box includes a top housing, a bottom housing and a top cover.

9. The electric junction box assembly as set forth in claim 8, wherein a top half of each of the plurality of inner walls are disposed on the top housing and a bottom half of each of the plurality of inner walls are disposed on the bottom housing.

10. The electric junction box assembly as set forth in claim 9, further including a coupling member configured to couple the bottom housing to the top housing wherein the top half of each of the plurality of inner walls are registered to a respective bottom half of the plurality of inner walls so as to form a respective inner opening.

11. The electric junction box assembly as set forth in claim 10, wherein the coupling member is a snap-fit engagement, wherein the top housing includes a prong having a lip and the bottom housing includes a bracket having a slit configured to receive the lip so as to secure the bottom housing to the top housing.

12. The electric junction box assembly as set forth in claim 7, wherein each of the inner opening is coaxial to the outer opening.

13. The electric junction box assembly as set forth in claim 7, wherein the corrugated tube includes a plurality of ridges disposed on an outer surface of the corrugated tube, each of the plurality of ridges being generally equally spaced apart from each other so as to form a plurality of grooves.

14. The electric junction box assembly as set forth in claim 13, wherein the plurality of inner walls is a first inner wall and a second inner wall, wherein the first inner wall is disposed between the outer wall and the second inner wall, the first inner wall and the outer wall defining a first inner chamber, and the second inner wall and the first inner wall defining a second inner chamber wherein the second inner chamber is larger than the first inner chamber.

15. The electric junction box assembly as set forth in claim 14, wherein one of the plurality of grooves is seated within the outer opening, and wherein the each of the plurality of ridges has a radius larger than the outer opening so as to retain the corrugated tube to the outer opening.

16. The electric junction box assembly as set forth in claim 15, wherein one of the plurality of ridges is disposed between the first inner wall and the outer wall.

\* \* \* \* \*